United States Patent [19]

Kitchen, III et al.

[11] Patent Number: 4,823,116

[45] Date of Patent: Apr. 18, 1989

[54] FLUID DETECTOR

[75] Inventors: George H. Kitchen, III; Nancy E. Kitchen, both of Rio Rancho; Neil B. McCleery; Eduardo Builes, both of Albuquerque, all of N. Mex.

[73] Assignee: International Lubrication and Fuel Consultants, Inc., Rio Rancho, N. Mex.

[21] Appl. No.: 126,903

[22] Filed: Nov. 30, 1987

[51] Int. Cl.⁴ ............................................. G08B 21/00
[52] U.S. Cl. ......................................... 340/603; 73/40
[58] Field of Search ............... 340/602, 603, 604, 605; 73/49.2, 40.5 R, 40, 863.23, 864.51, 864.73, 23

[56] References Cited

U.S. PATENT DOCUMENTS

| | | | |
|---|---|---|---|
| 2,284,147 | 5/1942 | Herrick | 73/864.73 |
| 3,719,936 | 3/1973 | Daniels et al. | 340/605 |
| 3,961,900 | 6/1976 | Gintelia | 25/254 E |
| 3,995,472 | 12/1976 | Murray | 73/40 |
| 4,043,180 | 8/1977 | Morris et al. | 340/605 |
| 4,125,822 | 11/1978 | Perren | 338/34 |
| 4,206,402 | 6/1980 | Ishido | 324/61 R |
| 4,305,068 | 12/1981 | Klein | 340/605 |
| 4,404,516 | 9/1983 | Johnson, Jr. | 324/54 |

OTHER PUBLICATIONS

U.S. EPA Research Report, *Underground Tank Leak Detection Methods: A State-of-the Art Review* (1986).
U.S. EPA Research Report, *Survey of Vendors of External Petroleum Leak Monitoring Devices for Use with Underground Storage Tanks*, FIGS. 5-14, 5-15, 5-19 5-17.

*Primary Examiner*—Stewart J. Levy
*Assistant Examiner*—Hezron E. Williams
*Attorney, Agent, or Firm*—Deborah A. Peacock; Robert W. Weig

[57] ABSTRACT

A fluid detector that senses fluids, activates an alarm and preserves a sample of the fluid for laboratory or on-site testing. The fluid detector includes a first container having a sealable cap and a fluid-passing portion, a second container disposable within the first container for collecting and storing a sample of the fluid. The detector can contain a fluid-responsive material which undergoes a change upon contact with the fluid. The change in the fluid-responsive material causes the second container to be sealed. The second container can contain a fluid collector so that the fluid can be analyzed.

83 Claims, 1 Drawing Sheet

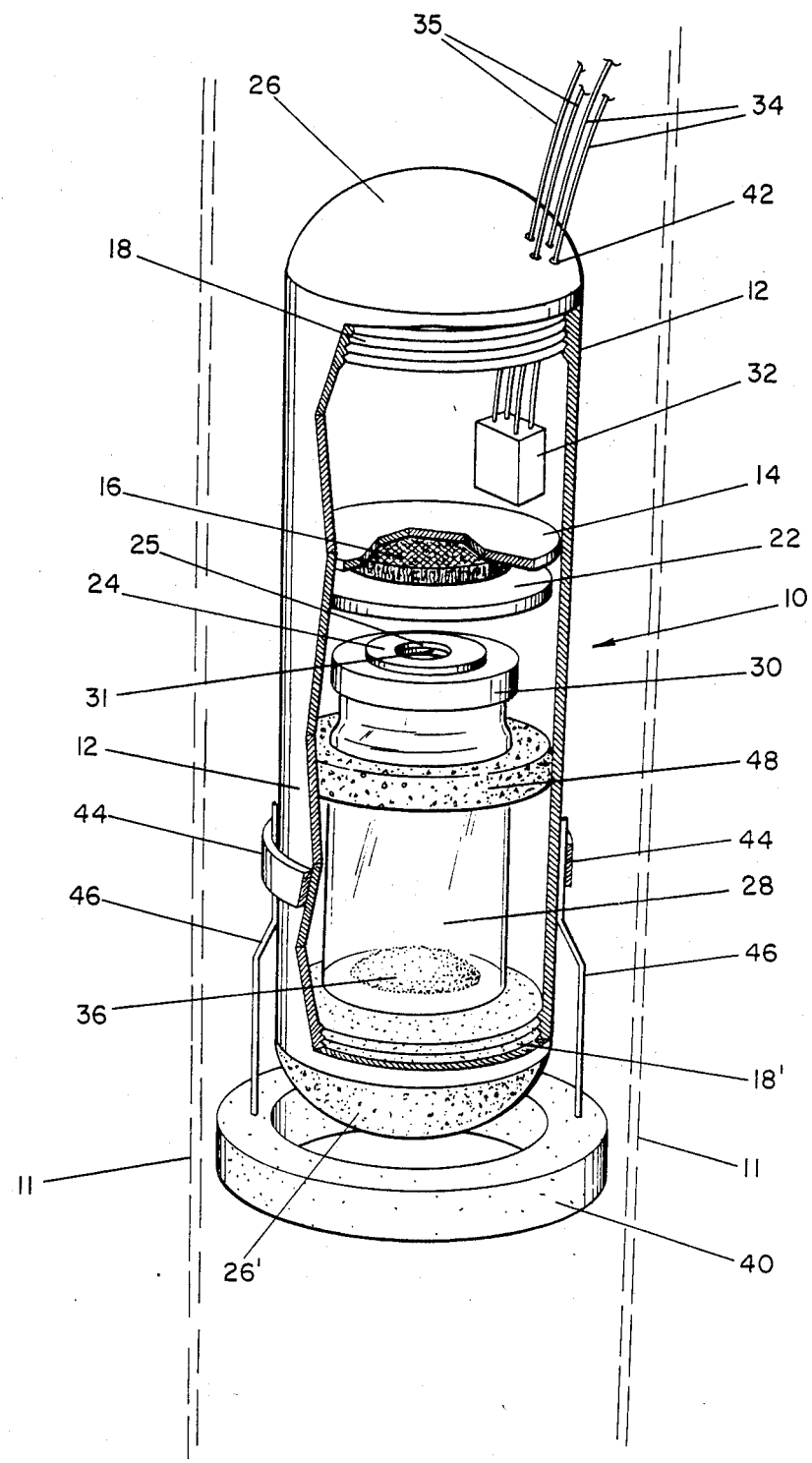

FLUID DETECTOR

BACKGROUND OF THE INVENTION

In today's world there is an awareness of the necessity of safeguarding the environment in which we live. Laws have been enacted and regulations promulgated to achieve a high ethic of responsibility for our environment. One problem faced by governments and individuals is the increasing incidence of leakage of toxic or hazardous substances from storage tanks into the soil and water supply. Detection of such leaks has become a priority. Early response to such releases can reduce the risks to human health and the enrivonment.

Several leak detection techniques are, at present, in use or have been proposed. Examples of existing devices and methods are those illustrated in several U.S. patents discussed hereinbelow. U.S. Pat. No. 3,995,472, entitled Detector System, to Murray, shows a liquid, vapor or gas detector in combination with an alarm system. The device uses a hose which deteriorates in the presence of the material to be detected. This renders the interior of the hose open to the atmosphere. Because the hose is subject to pressure from the pressurized storage system, pressure in the system decreases when the hose deteriorates. A pressure switch associated with the hose sets off an alarm. Since the hose is disposed beneath the tank to be monitored, the system of Murray is not extremely sensitive to fluids which may be emitted from the top or the sides of the tank into the surrounding soil. The Murray system additionally will not capture, in a container, any of the leaking substance. Also, the hose could deteriorate from naturally occurring substances within the soil because it is in constant contact with the soil and whatever acids or other corrosive substances may be present therein. In order to inspect or replace the hose after a period of time, the whole tank must be removed from the ground, which is an expensive operation.

Another device is shown in U.S. Pat. No. 4,125,822, entitled Probe for Determining Organic Liquids, to Perren, et al. This patent shows a detector comprising a rubber-like material which swells in response to the presence of an organic liquid to be detected. The detector comprises a plastic or rubber body which swells in contact with organic liquids such as mineral oil. The body contains conductive, fine, solid particles distributed therein so as to be in contact with each other. When sufficient contaminant enters the body, it swells, its electrical resistance increasing due to the swelling which moves the conductive particles apart. The inreased resistance is utilized in an external electrical circuit to set off an alarm.

Another prior art device, disclosed in U.S. Pat. No. 4,404,516, entitled System for Detecting Breaks from Liquid-Containing Reservoirs and Conduits, to Johnson, Jr., comprises a grid of electrically conductive wires which are placed directly under a tank, reservoir or conduit to be monitored for leakage and relies upon corrosion of the wires, alternatively, degradation of insulation around the wires, in response to exposure to the leaking substance. Wire or insulation corrosion causes a change in the electrical conductivity of the wires which is detected by electrically monitoring the wire grid. Because a grid is used, the location of the leak can be localized. This device is expensive to inspect or replace because the reservoir or conduit must first be removed to get to the electrical wire grid located beneath it.

U.S. Pat. No. 4,206,402, entitled System and Method for Detecting Leakage in a Pipeline or Tank, to Ishido, discloses a fluid leak detecting comprising a sensing coaxial cable permeable to oily fluids. The electrical carrying capacity of the coaxial cable changes upon penetration by the fluids and this change is detectable by monitoring an oscillating electrical signal from an external source. This device, too, is buried adjacent a pipeline or a tank and requires monitoring an external source of electrical signals. This and many other existing leak detectors require the input of an electrical signal from an outside soruce, when the source of the signal breaks down, the detectors cease to operate.

U.S. Pat. No. 3,961,900, entitled Combustible Vapor detector, to Gintelia shows a device for detecting the presence of combustible vapors in the air. An aluminum heat sink and a chamber through which samples of air are continuously drawn are utilized. Separate filaments that change in resistive value as a function of the presence of combustible gas in contact therewith are disposed within the chambers. Once again, continuously operating electrical circuitry is required as well as a filament burn-out detection circuit and an unbalanced wheatstone bridge, which goes through balance to a reverse unbalanced condition when a combustible vapor comes into contact with the sensing element.

U.S. Pat. No. 4,305,068, entitled Detector System, to Klein, shows a system for detecting leaks in tanks and pipelines. A sensor degradable on contact with the liquid, gas or vapor to be detected contains a fluid, the level of which is monitored by electrodes and an external electrical circuit. When the sensor body degrades, the fluid flows therefrom to reduce the fluid level and open the circuit between the electrodes to activate an alarm system.

As will be appreciated by those skilled in the art, none of these prior art systems offers a manner of collecting, for analyses, the triggering contaminant isolated from surrounding substances. Most of the above mentioned patents disclose detection systems which have to be continuously monitored and managed and frequently must be periodically inspected in order for the continuing integrity thereof to be assured. In many situations, an inspection requires the expensive and time-consuming removal of a tank or a pipeline, requiring extensive excavation, during which the monitor of detector would be inoperative or unreliable. None of these detectors are easily removable for examination or easily tested for operability and condition. Many of the detection systems disclosed hereinabove are expensive to fabricate and require surveillance by skilled personnel as well as expensive electrical apparatus. None of the prior art detectors is inexpensive to manufacture or easily inspected and replaced by unskilled people in the field.

SUMMARY OF THE INVENTION

In accordance with the present invention there is provided a fluid detector comprising a first container having a body, at least one sealable cap and at least one fluid-passing portion. A second container, comprising a receptacle for collecting a sample of the fluid, is positionable within the first container. A receptacle lid is provided and is positioned adjacent to but spaced from the receptacle mouth. A receptacle lid positioning means is provided which is responsive to the fluid and allows the receptacle lid to move and cover the receptacle mouth and thereby trap some of the fluid within the receptacle. A receptacle lid attracting and moving means attracts and moves the receptacle lid into place on the receptacle mouth to cover the receptacle mouth. A circuit comprising a switch responsive to the movement of the lid initiates a signal indicating the presence of fluid.

The fluid detector of the invention is useful for detecting vapors, liquids, gases or a combination thereof. When vapors or gases are to be detected, the fluid-passing portion is a vapor-passing portion and the receptacle lid positioning means is responsive to gas or vapor of the substance being monitored to allow the lid to cover the receptacle mouth and trap some of the vapor or gas within the receptacle.

The preferred fluid-passing portion of the invention is a fritted area. The fluid-passing portion may be present on the cap.

The preferred body of the fluid detector is a tube which is placeable within a fluid-passing housing. The tube preferably comprises a cap at the bottom of the tube with the fluid-passing portion on the cap. If groundwater will intrude upon the tube when placed within the housing, the tube may further comprise a buoyant donut to keep the fluid-passing portion away from the water.

The receptacle may comprise a glass jar or other material, such as inert plastic, which is not sensitive to the fluid.

For detection of vapors, and sometimes for detection of liquids, a preselected fluid collector is placed within the receptacle by the user or manufacturer. This fluid collector is preselected to preserve and store at least one fluid being monitored within the receptacle. This fluid collector may be an absorbent or adsorbent material.

Lid attraction and movement can be provided by components comprising magnetic material and magnetically-responsive material. The lid can comprise magnetic material and the receptacle mouth magnetically-responsive material, or vice versa.

The lid positioning means preferably comprises a fluid-responsive material which undergoes either a mechanical or chemical change in the presence of the fluid to allow the lid to move and to trap some of the fluid within the receptacle. The fluid-responsive material can be responsive to hydrocarbons or other substances. Examples of materials responsive to hydrocarbons are ethyl cellulose, polyphenylene ether, polyethylene, polymethylpentene, polystyrene, styrene-acrylonitrile, polysulfone, paraffin and wax. The fluid-responsive material can be a combination of paraffin and low-density polyethylene. Examples of other materials which are responsive to other substances include ceresin wax (responsive to alcohol and chloroform), para-ter-butyl-phenol acetylene resin (responsive to acetone, cyclohexane, ethyl acetate, n-butanol, and ethanol), polyvinyl stearate (responsive to carbon tetrachloride), and methyl cerotate (responsive to alcohol and ether). The circuit and switch can comprise a capability for testing the operability of the fluid detector.

One object of the present invention is to provide inexpensive but reliable fluid detection.

Another object of the invention is to provide a sample of detected leaking fluids for analyses.

One advantage of the invention is that a fluid detector in accordance therewith is readily inspectable and easily replaceable in the field.

Another advantage of the instant invention is that a fluid detector in accordance therewith is easily installed at existing storage tank and pipeline sites without excavating the tank or pipeline.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated into and forms a part of the specification, illustrates an embodiment of the present invention and, together with the description, serves to explain the principles of the invention.

The sole FIGURE in the drawing illustrates the preferred embodiment of the invention which comprises a fluid detector and an alarm producer for providing a response to a particular fluid.

DESCRIPTION OF THE PREFERRED EMBODIMENT

This invention relates to a sensor or fluid detector that detects a particular field, activates an alarm and collects a sample of the fluid for laboratory analysis. As used herein, fluid can comprise a liquid, a vapor, a gas, or a combination thereof. Also, as used herein, the terms "vapor" and "vapors," "liquid" and "liquids," "fluid" and "fluids," and "gas" and "gases" are all intended to include both singular and plural meanings.

Some examples of uses of the fluid detector of the invention are as follows. When an underground storage tank begins to corrode, crack or break down, vapors of the substances contained in the tank will often leak out before any liquid begins to emerge. Detection of vapors at this early stage by the detector of the invention enables one to repair, drain or remove the storage tank before the fluid therein contaminates the surrounding environment. For major cracks or breaks in a storage tank, such as during its filling, vapors accompanying the leaking liquid are also immediately detectable by the fluid detector of the invention so that immediate repairs to or removal of the tank can be accomplished. When fluids are detected by the fluid detector of the invention, an alarm is activated. The detector collects a sample of the fluid so that the source, type and quantity of the fluid can be analyzed. this is useful to determine the extent and location of the leak. The detector is positionable near or adjacent to the vessel or storage tank to be monitored. The vessel may be underground, partially unerground or above-ground. The detector of the invention is not limited to detecting leaks from storage tanks or vessels; the detector is also useful for detecting leaks in pipelines and for detecting substances not associated with a nearby storage tank or vessel such as oil from an oil spill which has affected a seashore, gases associated with a geologically active site, etc. For purposes of describing the preferred embodiment of the invention, the use of a fluid detector for detecting a leak from a stoage tank is most often described in the specification.

The fluid detector of the invention comprises a first container comprising a body, at least one sealable cap and at least one fluid-passing portion; a second container, disposable within the first container, comprising a receptacle which comprises a receptacle mouth; a receptacle lid, receptacle lid attracting and moving means for attracting and moving the receptacle lid into place on the receptacle mouth; receptacle lid positioning means for positioning the receptacle lid adjacent to but spaced from the receptacle mouth, and a circuit and switch resposive to movement of the receptacle lid for initiating a signal. A user or manufacturer may place a preselected fluid collector in the receptacle, such as an adsorbent or absorbent material, as indicated by the detection needs. This fluid collector enables a user to collect, store and preserve a particular fluid in the receptacle so that analyses can be performed to determine, for example, the quantity and type of fluid. If a liquid is being collected, the fluid collector may not be necessary. The receptacle lid positioning means preferably comprises a fluid-responsive material which responds to the fluid, thereby allowing the lid attracting and moving means to cause the lid to cover the receptacle mouth and capture and seal some of the fluid within the receptacle. The fluid-responsive material may be responsive to hydrocarbons, such as gasoline, or other petroleum-based products including jet fuel, diesel fuel or kerosene, or may be responsive to other hazardous to toxic substances which may be present due to a leak or other occurrence. Alternative receptacle lid positioning means can include, for example, a micro pH meter, wherein the triggering substance which causes a change in the pH within the detector also causes the lid to cover the receptacle mouth.

For vapor detection, a portion of the first container is capable of passing the vapor to be detected. The receptacle lid positioning means is repsonsive to the vapor, thereby allowing the lid attracting and moving means to cause the lid to cover the receptacle mouth and capture some of the vapor within the receptacle. A user or manufacturer places a preselected vapor collector in the receptacle to store and preserve the vapor for analyses. In the preferred embodiment, the receptacle lid positioning means comprises a vapor-responsive material which responds to the vapor to cause the lid to cover the receptacle mouth.

Referring to the sole FIGURE of the drawing, the preferred fluid detector 10 of the invention comprises a tube 12 as the first container, preferably constructed of a material, such as glass, polycarbonate or plastic, which is inert or substantially nonsensitive to the contents or fluids of the substance or substances being monitored. The tube 12 is preferably slidably positionable within a porous, fluid-passing pipe 11, such as a pipe made of polyvinyl chloride (PVC). Within the tube 12 is a porous plate 14, such as a ceramic plate, which is fixed in position by attachment to the interior wall of the tube 12. A fluid-responsive material 16 is affixed to both the porous plate 14 and to a receptacle lid 22 which is preferably magnetic or comprises a magnetic portion, or has a magnet affixed thereto. When a predetermined fluid within the monitored vessel comes into contact with the fluid-responsive material 16, the fluid-responsive material 16 degrades or changes, thereby releasing its connection to the plate 14. This degradation or change may comprise a phase change or any type of mechanical or chemical change which causes the fluid-responsive material 16 to, for example, melt, stretch, crack, shrink, flow, dissolve, outgas or elongate in the presence of the fluid to be detected. The fluid-responsive material 16 is attached to the porous plate 14 and the lid 22 by using either the inherent cohesive property of the fluid-responsive material 16 or by other attachment devices, such as an adhesive, common to the art. The lid 22 preferably comprises a magnet or magnetic portion. When the monitored fluid invades the tube 12, the fluid-responsive material 16 changes, thereby allowing the lid 22 to fall due to gravity and magnetic attraction to a magnetically-responsive material such as an iron-comprising metal washer 24. The metal washer 24 has an aperture 25 disposed at or near the mouth of a receptacle 28, such as a receptacle cap 30 containing an aperture 31. The lid 22 drops in place on the receptacle mouth and seals the receptacle 28, thereby trapping some of the same fluid which caused the physical or chemical change to the fluid-responsive material 16. As can be appreciated by one skilled in the art, the entire lid 22 could comprise magnetic material or a magnet could be secured to the lid 22, or the lid 22 can comprise a magnetic portion. Similarly, the receptacle or washer could comprise a magnetic material and the lid a magnetically-responsive material. The washer could encircle a neck in the receptacle, just below its mouth or it could be disposed on the receptacle to form its mouth. Other modifications within the scope of the invention will be approved to those practicing the art.

Examples of fluid-responsive materials, responsive to hydrocarbon compounds such as gasoline, diesel fuel, toluene, benzene or other solvents are: ethyl celllose, polyphenylene ether, polyethylene polymethylpentene, polystyrene, styrene-acrylonitrile, polysulfones, paraffin and other microcrystalline waxes, alone or in various combinations. A specific substance responsive to petroleum-based products is a combination of paraffin and low-density polyethylene, ranging from 0% paraffin and 100% low-density polyethylene to 100% paraffin and 0% low-density polyethylene. When petroleum fluids come into contact with a compound of paraffin and low-density polyethylene, the compound will elongate or crack depending upon the percentages of paraffin and low-density polyethylene contained in the compound. As can be appreciated by one skilled in the art, numerous hydrocarbon-responsive cements, glues, adhesives and other materials can also be used in accordance with the invention for the detection of hydrocarbon fluids; the invention is not limited to those particular classes of materials listed above.

Other non-limiting examples of fluid-responsive materials selectively responsive to other substances include the following:

| Stored Substance | Fluid-Responsive Material |
| --- | --- |
| alcohol, chloroform | ceresin wax |
| acetone, cyclohexane, | para-ter-butylphenol |
| ethyl acetate, | acetylene resin |
| n-butanol, ethanol | |
| carbon tetrachloride | polyvinyl stearate |
| alcohol, ether | methyl cerotate |

The tube 12 shown in the drawing preferably comprises at least one sealable cap 26 to allow a user access to the interior of the first container. Access is important to conduct repairs and enable the receptacle 28 to be replaced or removed for laboratory analysis of the fluid captured therein. The drawing of the preferred embodiment shows threading 18 and 18' on the ends of the tube 12 to allow top and bottom caps 26 and 26' to be screwed into position, thereby encapsulating the contents of the tube 12.

The tube 12 comprises at least one fluid-passing portion for allowing fluid to enter the interior of the tube 12 and the receptacle 28. The fluid-passing portion is shown in the drawing by dots representing fritting on cap 26'. Either one or both of caps 26 and 26' or any portion of the tube 12 can be made by a form of construction commonly known as fritting, which is a process of incorporating air bubbles into a glass or ceramic material, thereby creating a porosity which will allow intrusion of selective fluids, while restricting information of other fluids. As can be appreciated by those skilled in the art, fritting is not the only fluid-passing technique which can be utilized in accordance with the invention to allow monitored fluids to pass into the interior of the first container while keeping water out. For example a permeable or semi-permeable membrane, preselected to allow only particular vapors or fluids to pass, are usable in practicing the invention. To avoid potential problems with spills onto a fluid detector 10 in position, the top cap 26, as shown in the drawing, can be fluid impermeable. Thus, fluid spilled atop the detector would not enter and set off the alarm.

A monitored vessel is likely to come into contact with water, either in an underground or above-ground atmosphere. The present invention can restrict water entry, if desired, by incorporating a water-impermeable vapor-passing portion, such as fritting, into the construction of the detector. The fritting inhibits the entry of water but does not prevent the monitored fluids from passing into the interior of the first container.

The receptacle or bottle 28 is preferably made of a nondegradable material, such as glass or an inert plastic. The receptacle 28 is positioned inside the tube 12 and may rest on the bottom fritted cap 26'. The receptacle 28 is positionable within the tube 12, such as by a porous, nonsensitive, donut-shaped retainer 48 or a retaining wire, thereby retaining the receptacle upright within the tube 12. The receptacle 28 shown in the drawing may be removed either from the top or bottom of the tube 12 via the two caps 26 and 26'.

The user or manufacturer may place a preselected fluid collector 36 in the receptacle 28 for the purpose of trapping the fluids for collection and testing. A fluid collector is particularly important when vapors or gases are being collected. This preselected fluid collector 36 can comprise an adsorbent or absorbent material which provides collection and storage of the fluid for later analyses. Analysis of the collected fluid is useful for determining the severity of the leak, which storage tank the leak is coming from, whether the "leak" might be coming from another source, and the type and quantity of the fluid.

The fluid detector of the invention further comprises a circuit and switch comprising at least two wires for initiating a signal to indicate the presence of fluid within the interior of the firsst and second containers. The preferred embodiment comprises a conventional, commonly available 4-wire reed switch 32 which can be suspended from the cap 26 or, preferably, attached to the inside wall of the tube 12 by an adhesive or other well known means. The 4-wire reed switch provides two wires 34 which perform the signal function and the other two wires 35 which are available for testing the circuit. The four wires are threaded through apertures 42 drilled in the cap 26. The apertures 42 are then sealed to ensure against water leakage into the tube 12.

The switch can be magnetically responsive in any known manner. When fluid invades the tube 12 through the fritted cap 26', the fluid-responsive material 16 changes, allowing the lid 22 to drop into place on the receptacle 28. The downward movement of the lid 22 causes a change in the magnetic field which generates a triggering signal in the wires 34 or effects a change in an electrical signal passing through the wires 34 to close or open the switch 32. Alternatively, the switch 32 itself can be responsive to a change in the magnetic field and open or close in response to the change in the magnetic field brought about by the movement of the lid 22. In any case, a magnetic field change activates the reed switch 32 and current flows through the wires 34 or opens a circuit to trigger or activate an alarm connected thereto (not shown). The alarm may be positioned in any location where it can be heard, seen or otherwise detected. The alarm can be any of several well known types capable of creating attention, such as a bell, buzzer or light. The circuit may activate a specific dial sequence or radio transmitter causing a telephone to ring or an alarm to be activated by a a destination removed from the site. When the alarm goes off, an operator is made aware of the presence of fluid in the fluid detector. The fluid detector is retrieved by an operator and the fluid entrapped in the receptacle 28 can then be removed, tested and analyzed.

Those skilled in the art will appreciate that alternative switches can be used in practicing the invention. For example, a mechanical switch could be tripped when the lid drops. Alternatively, a circuit could be completed when the lid drops into place via connections to a conductive lid and a conductive receptacle monitor. Numerous switch-activating options exist and will be apparent to those practicing the art.

The fluid detector of the invention can be installed in a porous housing such a monitoring pipe 11, as shown in the drawing. This housing is preferably positioned near the tank reservoir or pipeline to be monitored, either underground or above-ground. One advantage of using the monitoring pipe 11 and the tube 12 shown in the drawing is that a standard pipe, common to the art, such as a porous polyvinylchloride (PVC) pipe which permits the invasion of fluids, can be utilized as a housing 11. A hole can easily be drilled near the storage tank to the monitored, the housing pipe 11 and tube 12 inserted in the hole, and the wires leading from the circuit and switch are disposed within the housing pipe 11 and connected to an alarm on the surface. When it is desired to remove the tube 12 from the housing pipe 11, the operator can simply pull on the wires 34 to pull the tube 12 up the housing pipe 11. The circuit and switch 32 can be tested by the operator without removing the fluid detector 10 from its underground position. If repairs are necessary, the fluid detector 10 is easily removable from the housing pipe 11. The fluid detector 10 can be made to float on water, which may intrude into the housing pipe 11. Therefore, a user may wish to use a buoyant device, such as donut-shaped float 40 affixed to the tube 12 by a clip 44 and springs 46 to keep the fritted lower cap 26' above the groundwater and available to fluid entry.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A fluid detector for detecting a fluid of a selected substance comprising:
   first container means comprising a body which comprises an upper portion, a lower portion, and at least one sealable cap comprising a fluid passing portion disposed on said lower portion of said body;
   second container means positionable within said first container means comprising a receptacle, said receptacle comprising a mouth;
   a receptacle lid;
   receptacle lid attracting and moving means for attracting and moving said receptacle lid place on said receptacle mouth to cover and seal said receptacle; and
   receptacle lid positioning means for positioning said receptacle lid adjacent to but spaced from said receptacle mouth, said receptacle lid positioning means being responsive to the fluid of said selected substance to allow said receptacle lid attracting and moving means to cause said receptacle lid to cover said receptacle mouth, thereby trapping some of the fluid within said receptacle.

2. The fluid detector of claim 1 wherein said fluid-passing portion of said first container means comprises at least one fritted area.

3. The fluid detector of claim 1 wherein said first container means is a tube placeable within a fluid-passing pipe housing, when provided.

4. The fluid detector of claim 3 wherein said tube further comprises a donut upon which the bottom of said tube rests within said fluid-passing pipe housing.

5. The fluid detector of claim 1 further comprising circuit and switch means responsive to movement of said receptacle lid for initiating a signal indicating the presence of fluid within said detector.

6. The fluid detector of claim 1 wherein said receptacle comprises a glass jar.

7. The fluid detector of claim 1 wherein an amount of preselected fluid collector, when provided, is disposed within said receptacle for collecting and storing at least one selected substance to be detected.

8. The fluid detector of claim 7 wherein said preselected fluid collector comprises a least one member selected from the group consisting of materials adsorbent to said fluid and materials absorbent to said fluid.

9. The fluid detector of claim 1 useful for detecting vapors wherein said fluid-passing portion is a vapor-passing portion, said preselected fluid collector is a vapor collector and said receptacle lid positioning means is responsive to a vapor of the selected substance to allow said receptacle lid attracting and moving means to cause said receptacle lid to cover said receptacle mouth, thereby trapping and sealing some of the vapor within said receptacle.

10. The fluid detector of claim 1 wherein said receptacle lid attracting and moving means comprises a magnetic material and a magnetically-responsive material.

11. The fluid detector of claim 10 wherein said receptacle lid comprises magnetic material and said receptacle comprises magnetically-responsive material.

12. The fluid detector of claim 10 wherein said receptacle lid comprises magnetically-responsive material and said receptacle comprises magnetic material.

13. The fluid detector of claim 1 wherein said receptacle lid positioning means comprising a fluid-responsive material being responsive to the fluid of said selected substance, whereby the fluid acts on said fluid-responsive material to allow said receptacle lid attracting and moving means to cause said receptacle lid to cover said receptacle mouth, thereby trapping and sealing some of the fluid within said receptacle.

14. The fluid detector of claim 13 wherein said fluid-responsive material of said receptacle lid positioning means changes in the presence of the fluid to allow said receptacle lid to move into place on said receptacle mouth.

15. The fluid detector of claim 14 wherein said fluid-responsive material of said receptacle lid positioning means undergoes a chemical change in the presence of the fluid to allow said receptacle lid to move into place on said receptacle mouth.

16. The fluid detector of claim 14 wherein said fluid-responsive material of said receptacle lid positioning means undergoes a mechanical change in the presence of the fluid to allow said receptacle lid to move into place on said receptacle mouth.

17. The fluid detector of claim 16 wherein said fluid responsive material of said receptacle lid positioning means is responsive to hydrocarbons.

18. The fluid detector of claim 17 wherein said fluid-responsive material comprises at least one member selected from the group consisting of ethyl cellulose, polyphenylene ether, polyethylene, polymethylpentene, polystyrene, styrene-acrylonitrile, polysulfone, paraffin, and other waxes.

19. The fluid detector of claim 13 wherein said fluid-responsive material of said receptacle lid positioning means comprises at least one member selected from the group consisting of ceresin wax, para-ter-butylphenol acetylene resin, polyvinyl stearate, and methyl cerotate.

20. The fluid detector of claim 5 wherein said circuit and switch means comprises testing means for testing the operability of the fluid detector.

21. A fluid detector for detecting a fluid of a selected substance comprising:
   first container means comprising a body, at least one sealable cap, and at least one fluid-passing portion;
   second container means positionable within said first container means comprising a receptacle, said receptacle comprising a mouth;
   a receptacle lid;
   receptacle lid attracting and moving means comprising a magnetic material and a magnetically responsive material for attracting and moving said receptacle lid into place on said receptacle mouth to cover and seal receptacle; and
   receptacle lid positioning means for positioning said receptacle lid adjacent to but sapaced from said receptacle mouth, said receptacle lid positioning means being responsive to the fluid of said selected substance to allow said receptacle lid attracting and moving means to cause said receptacle lid to cover said receptacle mouth, thereby trapping some of the fluid within said receptacle.

22. The fluid detector of claim 21 wherein said receptacle lid comprises magnetic material and said receptacle comprises magentically-responsive material.

23. The fluid detector of claim 21 wherein said receptacle lid comprises magnetically-responsive material and said receptacle comprises magnetic material.

24. The fluid detector of claim 21 further comprising circuit and switch means responsive to movement of said receptacle lid for initiating a signal indicating the presence of fluid within said detector.

25. The fluid detector of claim 21 wherein said fluid-passing portion of said first container means comprises at least one fritted area.

26. The fluid detector of claim 21 wherein said fluid-passing portion is positioned on said cap.

27. The fluid detector of claim 26 wherein said cap is fritted.

28. The fluid detector of claim 21 wherein said first container means is a tube placeable within a fluid-passing pipe housing, when provided.

29. The fluid detector of claim 28 wherein said tube comprises a lower cap comprising a fluid-passing portion.

30. THe fluid detector of claim 28 wherein said tube further comprises a donut upon which the bottom of said tube rests within said fluid-passing pipe housing.

31. The fluid detector of claim 21 wherein said receptacle comprises a glass jar.

32. The fluid detector of claim 21 wherein an amount of preselected fluid collector, when provided, is disposed within said said receptacle for collecting and storing at least one selected substance to be detected.

33. The fluid detector of claim 32 wherein said preselected fluid collector comprises at least one member selected from the group consisting of materials absorbent to said fluid and materials absorbent to said fluid.

34. The fluid detector of claim 32 useful for detecting vapors wherein said fluid-passing portion is a vapor-passing portion, said preselected fluid collector is a vapor collector and said receptacle lid positioning means is responsive to a vapor of the selected substance to allow said receptacle lid attracting and moving means to cause said receptacle lid to cover said receptacle mouth, thereby trapping and sealing one of the vapor within said receptacle.

35. The fluid detector of claim 21 wherein said receptacle lid positioning means comprising a fluid-responsive material being responsive to the fluid of said selected substance, whereby the fluid acts on said fluid-responsive material to allow said receptacle lid attracting and moving means to cause said receptacle lid to cover said receptacle mouth, thereby trapping and sealing some of the fluid within said receptacle.

36. The fluid detector of claim 35 wherein said fluid-responsive material of said receptacle lid positioning means changes in the presence of the fluid to allow said receptacle lid to move into place on said receptacle mouth.

37. The fluid detector of claim 36 wherein said fluid-responsive material of said receptacle lid positioning means undergoes a chemical change in the presence of the fluid to allow said receptacle lid to move into place on said receptacle mouth.

38. The fluid detector of claim 36 wherein said fluid-responsive material of said receptacle lid positioning means undergoes a mechanical change in the presence of the fluid to allow said receptacle lid to move into place on said receptacle mouth.

39. The fluid detector of claim 35 wherein said fluid-responsive material of said receptacle lid positioning means is responsive of hydrocarbons.

40. The fluid detector of claim 39 wherein said fluid-responsive material comprises at least one member selected from the group consisting of ethyl cellulose, polyphenylene ether, polyethylene, polymethylpentene, polystyrene, styrene-acrylonitrile, polysulfone, paraffin, and other waxes.

41. The fluid detector of claim 35 wherein said fluid-responsive material of said receptacle lid positioning means comprises at least one member selected from the group consisting of ceresin wax, para-ter-butylphenol acetylene resin, polyvinyl stearate and methyl cerotate.

42. The fluid detector of claim 24 wherein said circuit and switch means comprises testing means for testing the operability of the fluid detector.

43. A fluid detector for detecting a fluid of a selected substance comprising:

first container means comprising a body, at least one sealable cap and at least one fluid-passing portion;

second container means positionable within said first container means comprising a receptacle, said receptacle comprising a mouth;

a receptacle lid;

receptacle lid attracting and moving means for attracting and moving said receptacle lid into place on said receptacle mouth to cover and seal said receptacle; and receptacle lid positioning means for positioning said receptacle lid adjacent to but spaced from said receptacle mouth, said receptacle lid positioning means comprising a fluid-responsive material which mechanically changes in the presence of the fluid of said selected substance to allow said receptacle lid attractive and moving means to cause said receptacle lid to cover said receptacle mouth, thereby trapping some of the fluid within said receptacle.

44. The fluid detector of claim 43 further comprising circuit and switch means responsive to movement of said receptacle lid for initiating a signal indicating the presence of fluid within said detector.

45. The fluid detector of claim 43 wherein said fluid-passing portion of said first container means comprises at least one fritted area.

46. The fluid detector of claim 43 wherein said fluid-passing portion is positioned on said cap.

47. The fluid detector of claim 46 wherein said cap is fritted.

48. The fluid detector of claim 43 wherein said first container means is a tube placeable within a fluid-passing pipe housing, when provided.

49. The fluid detector of claim 48 wherein said tube comprises a lower cap comprising a fluid-passing portion.

50. The fluid detector of claim 48 wherein said tube comprises a donut upon which the bottom of said tube rests within said fluid-passing pipe housing portion.

51. The fluid detector of claim 43 wherein said receptacle comprises a glass jar.

52. The fluid detector of claim 43 wherein an amount of preselected fluid collector, when provided, is disposed within said receptacle for collecting and storing at least one selected substance to be detected.

53. The fluid detector of claim 52 wherein said preselected fluid collector comprises at least one member selected from the group consisting of materials adsorbent to said fluid and materials absorbent to said fluid.

54. The fluid detector of claim 52 useful for detecting vapors wherein said fluid-passing portion is a vapor-passing portion, said preselected fluid collector is a vapor collector and said receptacle lid positioning means is responsive to a vapor of the selected substance to allow said receptacle lid attracting and moving means to cause said receptacle lid to cover said receptacle mouth, thereby trapping and sealing some of the vapor within said receptacle.

55. The fluid detector of claim 43 wherein said receptacle lid attracting and moving means comprises a magnetic material and a magnetically-resposive material.

56. The fluid detector of claim 55 wherein said receptacle lid comprises magnetic material and said receptacle comprises magnetically-responsive material.

57. The fluid detector of claim 55 wherein said receptacle lid comprises magnetically-responsive material and said receptacle comprises magnetic material.

58. The fluid detector of claim 43 wherein said fluid-responsive material of said receptacle lid positioning means is responsive to hydrocarbons.

59. The fluid detector of claim 58 wherein said fluid-responsive material comprises at least one member selected from the group consisting of ethyl cellulose, polyphenylene ether, polyethylene, polymethylpentene, polystyrene, styrene-acrylonitrile, polysulfone, paraffin, and other waxes.

60. The fluid detector of claim 43 wherein said fluid-responsive material of said receptacle lid positioning means comprises at least one member selected from the gropu consisting of ceresin wax, para-ter-butylphenol acetylene resin, polyvinyl stearate, and methyl cerotate.

61. The fluid detector of claim 44 wherein said circuit and switch means comprises testing means for testing the operability of the fluid detector.

62. A fluid detector for detecting a hydrocarbon fluid comprising:
first container means comprising a body, at least one sealable cap and at least one fluid-passing portion;
second container means positionable within said first container means comprising a receptacle, said receptacle comprising a mouth;
a receptacle lid;
receptacle lid attracting and moving means for attracting and moving said receptacle lid into place on said receptacle mouth to cover and seal said receptacle;
receptacle lid positioning means for positioning said receptacle lid adjacent to but spaced from said receptacle mouth, said receptacle lid positioning means comprising a fluid-responsive material being responsive to the hydrocarbon fluid to allow said receptacle lid attracting and moving means to cause said receptacle lid to cover said receptacle mouth, thereby trapping some of the fluid within said receptacle, said fluid-responsive material comprising at least one member selected from the group consisting of ethyl cellulose, polyphenylene ether, polyethylene, polymethylpentene, polystyrene, styrene-acrylonitrile, polysulfone, paraffin, and other waxes.

63. The fluid detector of claim 62 wherein said fluid-responsive material is a combination of paraffin and low-density polyethylene.

64. The fluid detector of claim 62 wherein said fluid-responsive material of said receptacle lid positioning means comprises at least one member selected from the group consisting of ceresin wax, para-ter-butylphenol acetylene resin, polyvinyl stearate an methyl cerotate.

65. The fluid detector of claim 62 for detecting a hydrocarbon fluid further comprising circuit and switch means responsive to movement of said receptacle lid for initiating a signal indicating the presence of fluid within said detector.

66. The fluid detector of claim 62 wherein said fluid-passing portion of said first container means comprises at least one fritted area.

67. The fluid detector of claim 62 wherein said fluid-passing portion is positioned on said cap.

68. The fluid detector of claim 67 wherein said cap is fritted.

69. The fluid detector of claim 62 wherein said first container means is a tube placeable within a fluid-passing pipe housing, when provided.

70. The fluid detector of claim 69 wherein said tube comprises a lower cap comprising a fluid-passing portion.

71. The fluid detector of claim 69 wherein said tube further comprises a donut upon which the bottom of said tube rests within said fluid-passing pipe housing.

72. The fluid detector of claim 62 wherein said receptacle comprises a glass jar.

73. The fluid detector of claim 62 wherein an amount of preselected fluid collector, when provided, is disposed within said receptacle for collecting and storing at least one selected substance to be detected.

74. The fluid detector of claim 73 wherein said preselected fluid collector comprises at least one member selected from the group consisting of materials adsorbent to said fluid and materials absorbent to said fluid.

75. The fluid detector of claim 73 useful for detecting vapors wherein said fluid-passing portion is a vapor-passing portion, said preselected fluid collector is a vapor collector and said receptacle lid positioning means is responsive to a vapor of the selected substance to allow said receptacle lid attracting and moving means to cause said receptacle lid to cover said receptacle mouth, thereby trapping and sealing some of the vapor within said receptacle.

76. The fluid detector of claim 62 wherein said receptacle lid attracting and moving means comprises a magnetic material and a magnetically-responsive material.

77. The fluid detector of claim 76 wherein said receptacle lid comprises magnetic material and said receptacle comprises magnetically-responsive material.

78. The fluid detector of claim 76 wherein said receptacle lid comprises magnetically-responsive material and said receptacle comprises magnetic material.

79. The fluid detector of claim 62 wherein said receptacle lid positioning means comprising a fluid-responsive material being responsive to the fluid of said selected substance, whereby the fluid acts on said fluid-responsive material to allow said receptacle lid attracting and moving means to cause said receptacle lid to cover said receptacle mouth, thereby trapping and sealing some of the fluid within said receptacle.

80. The fluid detector of claim 79 wherein said fluid-responsive material of said receptacle lid positioning means changes in the presence of the fluid to allow said receptacle lid to move into place on said receptacle mouth.

81. The fluid detector of claim 80 wherein said fluid-responsive material of said receptacle lid positioning means undergoes a chemical change in the presence of the fluid to allow said receptacle lid to move into place on said receptacle mouth.

82. The fluid detector of claim 80 wherein said fluid-responsive material of said receptacle lid positioning means undergoes a mechanical change in the presence of the fluid to allow said receptacle lid to move into place on said receptacle mouth.

83. The fluid detector of claim 65 wherein said circuit and switch means comprises testing the operability of the fluid detector.

* * * * *